United States Patent
Fujita et al.

(10) Patent No.: US 9,577,390 B2
(45) Date of Patent: Feb. 21, 2017

(54) ELECTRONIC DEVICE, ATTACHMENT, AND CONNECTION CABLE

(71) Applicant: Panasonic Intellectual Property Management Co., Ltd., Osaka (JP)

(72) Inventors: Shinji Fujita, Osaka (JP); Hideki Harada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/868,490

(22) Filed: Sep. 29, 2015

(65) Prior Publication Data
US 2016/0020565 A1 Jan. 21, 2016

Related U.S. Application Data

(63) Continuation of application No. PCT/JP2014/001375, filed on Mar. 11, 2014.

(30) Foreign Application Priority Data

Apr. 4, 2013 (JP) .................................. 2013-078300

(51) Int. Cl.
*H01R 13/44* (2006.01)
*H01R 24/38* (2011.01)
(Continued)

(52) U.S. Cl.
CPC ............. *H01R 24/38* (2013.01); *G06F 1/1616* (2013.01); *G06F 1/1656* (2013.01); *G06F 1/182* (2013.01);
(Continued)

(58) Field of Classification Search
CPC ... H01R 13/64; H01R 13/6456; H01R 13/645; H01R 13/447; H01R 13/5213
(Continued)

(56) References Cited

U.S. PATENT DOCUMENTS

| 2,502,302 A | * | 3/1950 | Arson | ..................... H01R 24/20 439/268 |
| 6,533,619 B2 | * | 3/2003 | Wakata | ................ H01R 13/642 439/202 |

(Continued)

FOREIGN PATENT DOCUMENTS

| JP | 4-66074 | 6/1992 |
| JP | 3007979 | 12/1994 |

(Continued)

OTHER PUBLICATIONS

International Preliminary Report on Patentability and Written Opinion of the International Searching Authority mailed Oct. 15, 2015 in International (PCT) Application No. PCT/JP2014/001375.
(Continued)

*Primary Examiner* — Hien Vu
(74) *Attorney, Agent, or Firm* — Wenderoth, Lind & Ponack, L.L.P.

(57) ABSTRACT

An electronic device includes an accepting connection terminal to which a connection cable can be connected, and a rotation inhibiting member that inhibits the connection cable from rotating an amount equal to or greater than a predetermined amount around the accepting connection terminal in a state where the connection cable is connected to the accepting connection terminal.

7 Claims, 14 Drawing Sheets

(51) Int. Cl.
    *H01R 13/56* (2006.01)
    *H01R 13/73* (2006.01)
    *G06F 1/16* (2006.01)
    *G06F 1/18* (2006.01)
    *H01R 13/502* (2006.01)
    *H01R 13/639* (2006.01)
    *H01R 101/00* (2006.01)

(52) U.S. Cl.
    CPC ............ *H01R 13/502* (2013.01); *H01R 13/56* (2013.01); *H01R 13/6395* (2013.01); *H01R 13/73* (2013.01); *G06F 2200/1633* (2013.01); *H01R 2101/00* (2013.01); *H01R 2201/06* (2013.01)

(58) Field of Classification Search
    USPC .................................. 439/680, 142, 915, 350
    See application file for complete search history.

(56) References Cited

U.S. PATENT DOCUMENTS

| | | | | |
|---|---|---|---|---|
| 7,097,514 B2* | 8/2006 | Ishizaki | ............... | H01R 24/542 |
| | | | | 439/681 |
| 7,207,844 B2* | 4/2007 | Peng | ...................... | H01R 13/64 |
| | | | | 439/173 |
| 7,435,112 B1* | 10/2008 | Miller | .................. | H01R 13/502 |
| | | | | 439/133 |

FOREIGN PATENT DOCUMENTS

| | | |
|---|---|---|
| JP | 2000-299162 | 10/2000 |
| JP | 2007-172857 | 7/2007 |
| JP | 2009-110348 | 5/2009 |

OTHER PUBLICATIONS

International Search Report issued Jun. 10, 2014 in International (PCT) Application No. PCT/JP2014/001375.

\* cited by examiner

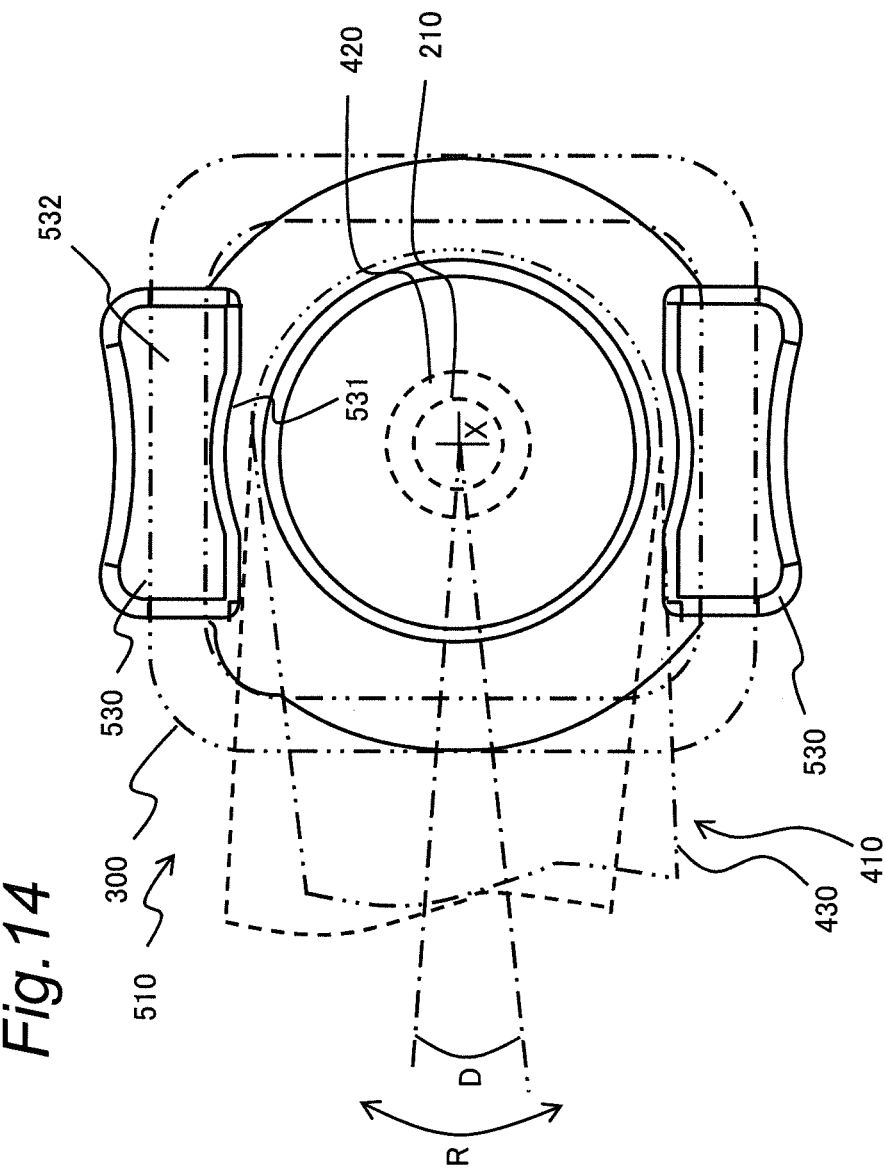

ELECTRONIC DEVICE, ATTACHMENT, AND CONNECTION CABLE

CROSS-REFERENCE TO RELATED APPLICATIONS

This is a continuation application of International Application No. PCT/JP2014/001375, with an international filing date of Mar. 11, 2014, which claims priority of Japanese Patent Application No.: 2013-078300 filed on Apr. 4, 2013, the content of which is incorporated herein by reference.

BACKGROUND

1. Technical Field

This disclosure relates to an electronic device, an attachment, and a connection cable.

2. Related Art

JPA 2007-172857 discloses a power cable supplying power to an electronic device. JPA 2007-172857 discloses also a technique of molding a cable protector integrally with the power cable to improve the durability of the power cable.

SUMMARY

This disclosure provides an electronic device, an attachment, and a connection cable that are improved in durability.

An electronic device according to the present disclosure includes an accepting connection terminal to which a connection cable can be connected, and a rotation inhibiting member that inhibits the connection cable from rotating an amount equal to or greater than a predetermined amount around the accepting connection terminal in a state where the connection cable is connected to the accepting connection terminal.

An attachment according to the present disclosure is utilized upon connection of a connection cable to an accepting connection terminal of an electronic device. The attachment includes a fitting-in portion that is allowed to fit in with a part of a housing of the electronic device, and a projection that projects outward with respect to an external surface of the housing in a state where the fitting-in portion fits in with a part of the housing of the electronic device. The projection is formed at a position where the projection and the connection cable come into abutment against each other when the connection cable rotates a predetermined amount around the accepting connection terminal in a state where the fitting-in portion fits in and where the connection cable is connected to the accepting connection terminal.

A connection cable according to the present disclosure includes a connection terminal connectable to an accepting connection terminal of the electronic device, and the attachment according to the present disclosure.

According to this disclosure, there can be provided an electronic device, an attachment, and a connection cable that have further improved durability.

BRIEF DESCRIPTION OF DRAWINGS

FIG. 14 is an enlarged view of the side surface of the electronic device body fitted with the attachment in the first embodiment.

DETAILED DESCRIPTION

Embodiments will be described in detail with proper reference to the drawings. However, unnecessarily detailed description may be omitted. For example, detailed description of already well-known matters or repeated description of substantially the same configurations may be omitted. This is for the purpose of preventing the following description from becoming unnecessarily redundant to facilitate the understanding of those skilled in the art.

The inventor (s) provide the accompanying drawings and the following description in order for those skilled in the art to fully understand this disclosure, but do not intend to limit thereby the subject matter defined in the patent claims.

First Embodiment

An electronic device, an attachment, and a connection cable according to a first embodiment will be described with reference to the drawings.

1-1. Configuration

The electronic device according to this embodiment includes an electronic device body and the attachment. The connection cable can be connected to the electronic device body.

1-1-1. Configuration of Electronic Device Body

Figure 1:
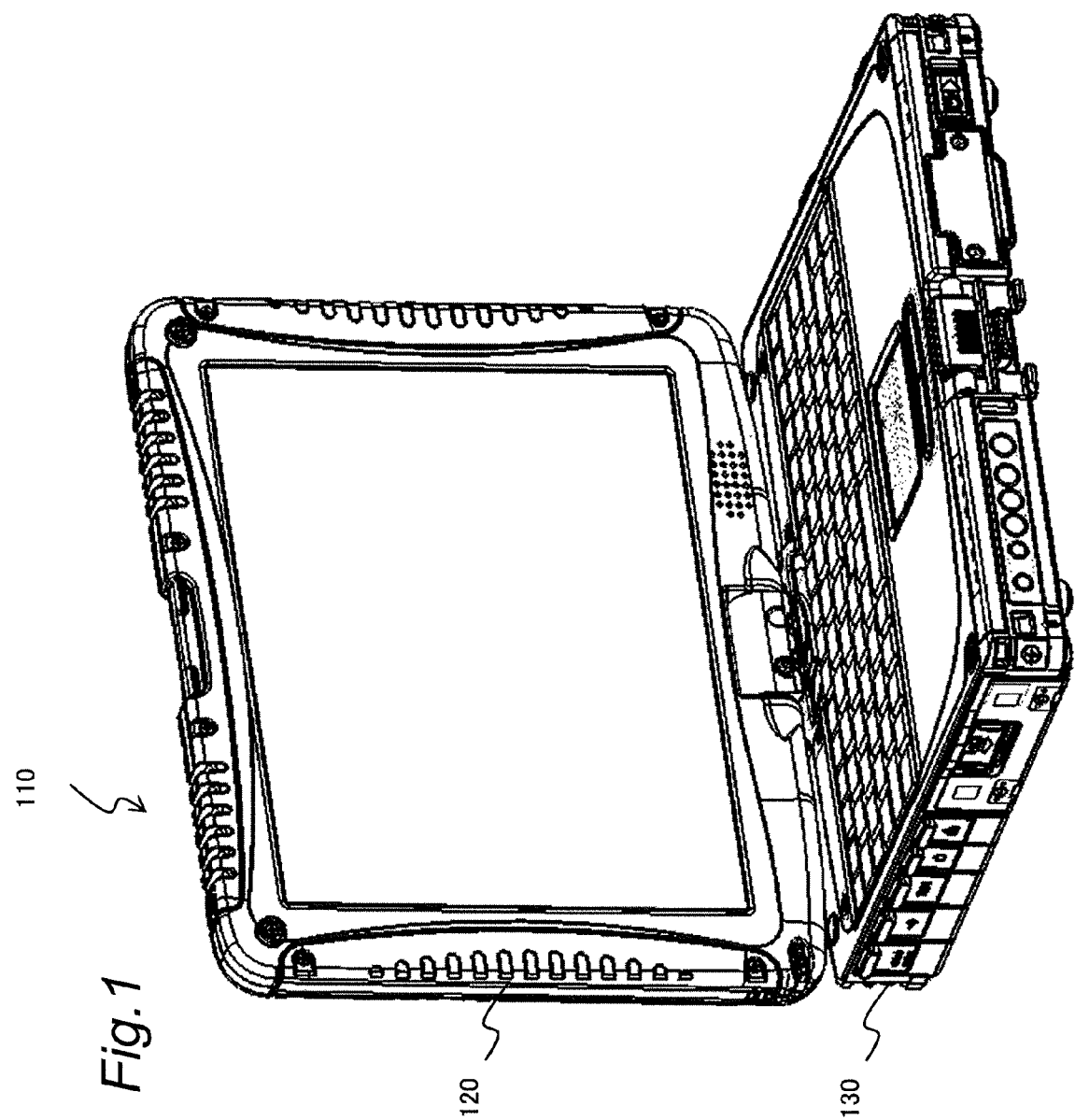
FIG. 1 is a view showing an external appearance of an electronic device body in a first embodiment.

FIG. 1 is a view showing an external appearance of the electronic device body in the first embodiment.

In this embodiment, an electronic device body 110 is a notebook computer. The electronic device body 110 includes an upper housing 120 and a lower housing 130. The upper housing 120 has a liquid crystal screen. The lower housing 130 is hinged to the upper housing 120. A power circuit, a control circuit, a storage, and the like are arranged within the interior of the lower housing 130. A keyboard is disposed on a surface of the lower housing 130. The keyboard is an interface for the user to operate the electronic device. The keyboard outputs a signal corresponding to an instruction accepted from the user, to the control circuit. The control circuit controls operations of the electronic device, based on a signal accepted from the keyboard and displays an image based on the instruction on the liquid crystal screen of the upper housing 120.

Figure 2:
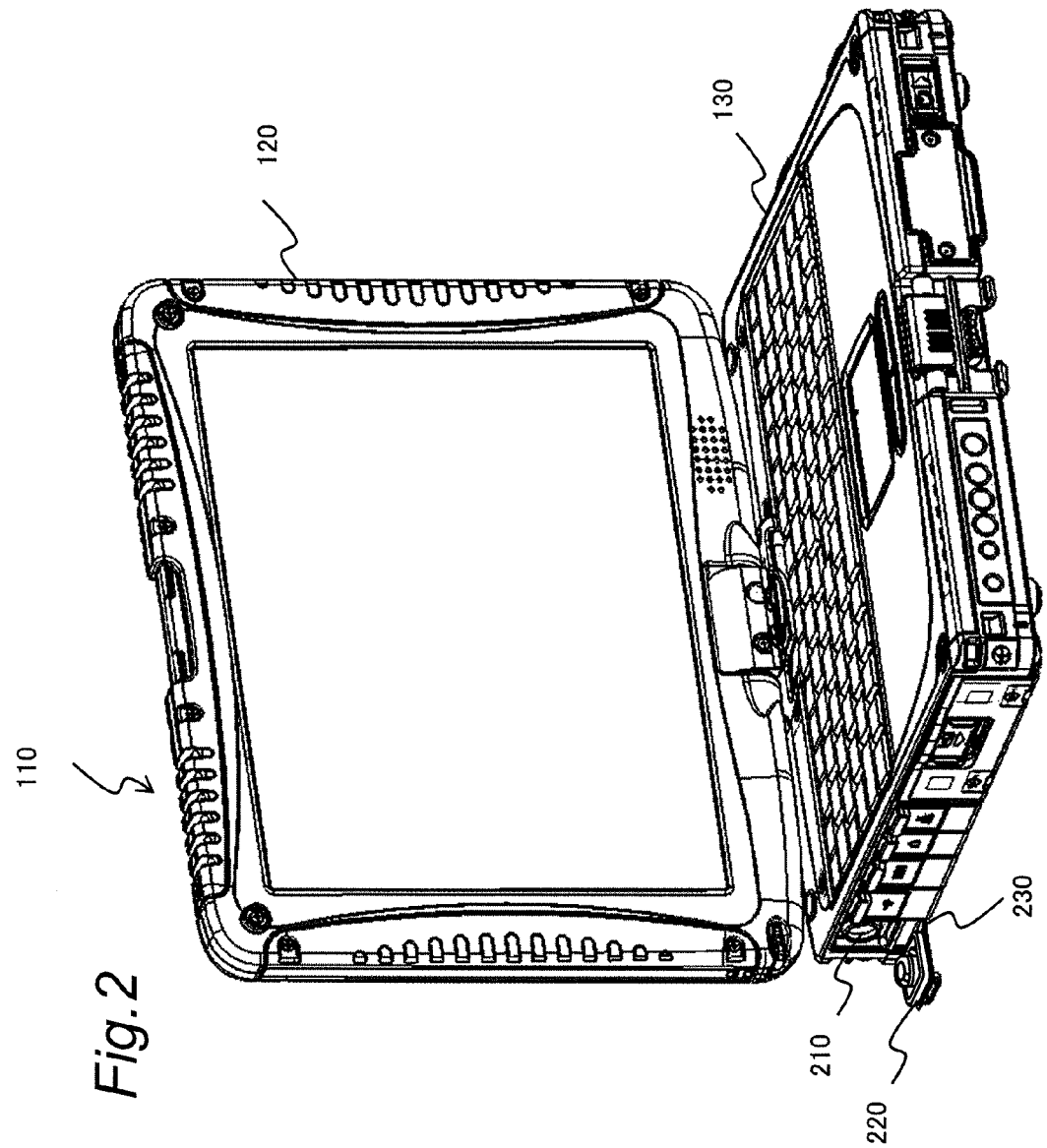
FIG. 2 is a view showing a state where there is exposed an accepting connection terminal of the electronic device body in the first embodiment.

FIG. 2 is a view showing a state where an accepting connection terminal of the electronic device body in the first embodiment is exposed.

The electronic device body 110 has an accepting connection terminal 210 to which the connection cable (a power cable in this embodiment) can be connected.

The accepting connection terminal 210 is electrically connected to the power circuit disposed within the interior of the lower housing 130. The accepting connection terminal 210 is supplied with power so that the electronic device body 110 operates.

The lower housing 130 has a cover 220 and a support (hinge portion) 230 disposed around the accepting connection terminal 210.

The cover 220 is made of resin.

The support 230 provides a support for the cover 220 against the lower housing 130. The support 230 is formed by thinning an end (edge) of a member making up an outer shell of the cover 220, the end (edge) being an end (edge) which positions the lower housing 130 side. As a result, the support 230 has a flexibility to allow the cover 220 to turn around the support 230. By turning, the cover 220 can take two states, i.e., an open state and a closed state. FIG. 2 shows an example of the open state. In the open state, the accepting connection terminal 210 is partly exposed to the exterior of the lower housing 130. FIG. 1 shows an example of the closed state. In the closed state, the accepting connection terminal 210 is shielded by the cover 220. In the closed state, the lower housing 130 is also partly shielded by the cover 220.

Figure 3:
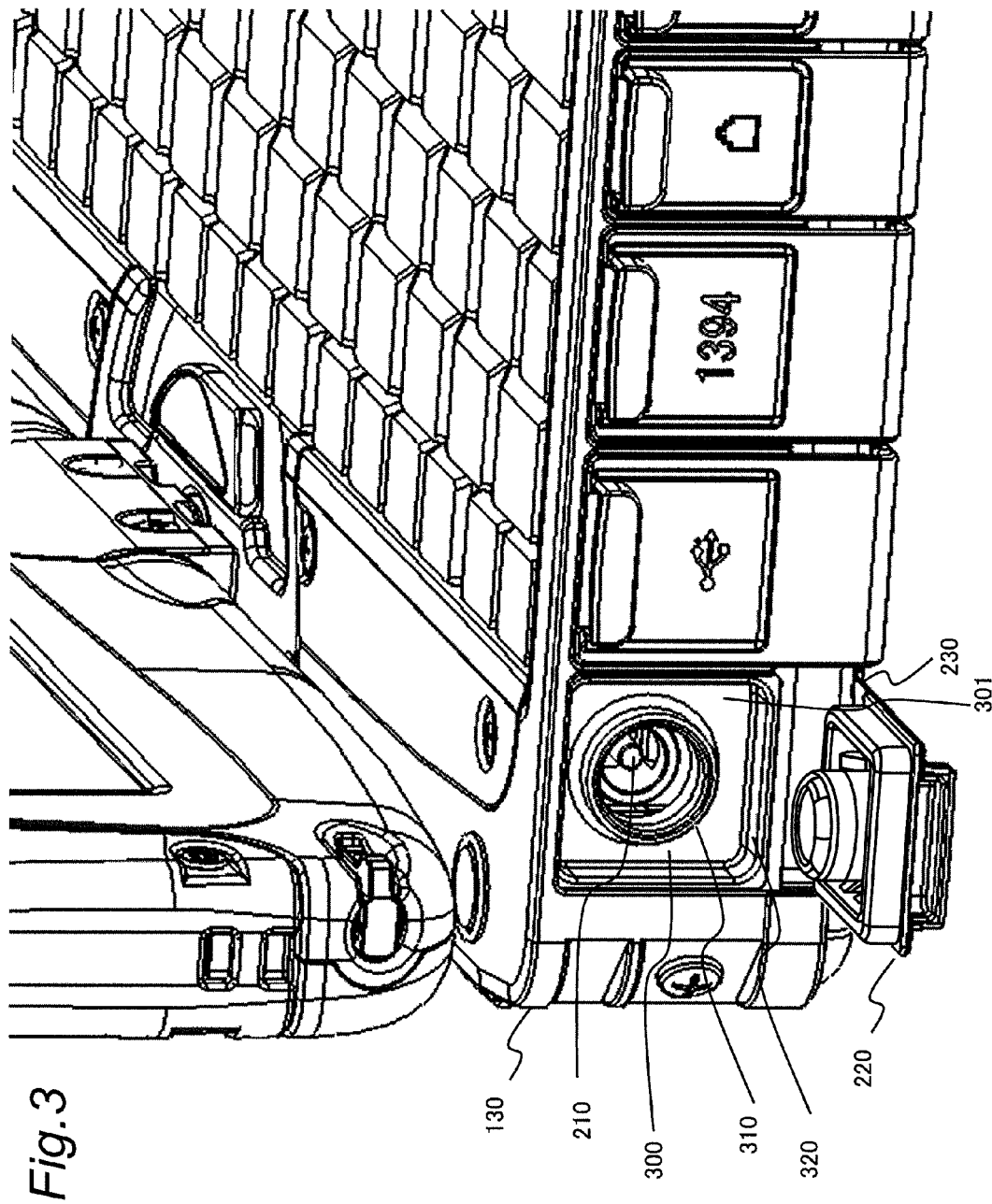
FIG. 3 is an enlarged view showing a state where there is exposed the accepting connection terminal of the electronic device body in the first embodiment.

FIG. 3 is an enlarged view showing a state where the accepting connection terminal of the electronic device body in the first embodiment is exposed. The open state of the cover 220 will be described in detail based on FIG. 3.

As shown in FIG. 3, the accepting connection terminal 210 is a pin with a circular sectional shape. The lower housing 130 has a recess 300 formed around the accepting connection terminal 210.

The recess 300 is formed by recessing a side surface of the lower housing 130 toward the interior of the lower housing 130 by a predetermined amount. The recess 300 and a bottom surface 301 of the recess 300 have a substantially square shape when viewed from the direction of the side surface of the lower housing 130. The accepting connection terminal 210 is disposed inside the recess 300.

The bottom surface 301 of the recess 300 is formed with an annular rib 310 having an annular shape when viewed from the direction orthogonal to the side surface of the lower housing 130 (hereinafter, referred to as "annular rib 310") as necessary. The annular rib 310 is formed by protruding from the bottom surface 301 of the recess 300 outward in the direction orthogonal to the side surface of the lower housing 130 by a predetermined amount. The annular rib 310 surrounds the accepting connection terminal 210.

1-1-2. Configuration of Connection Cable

Figure 4:
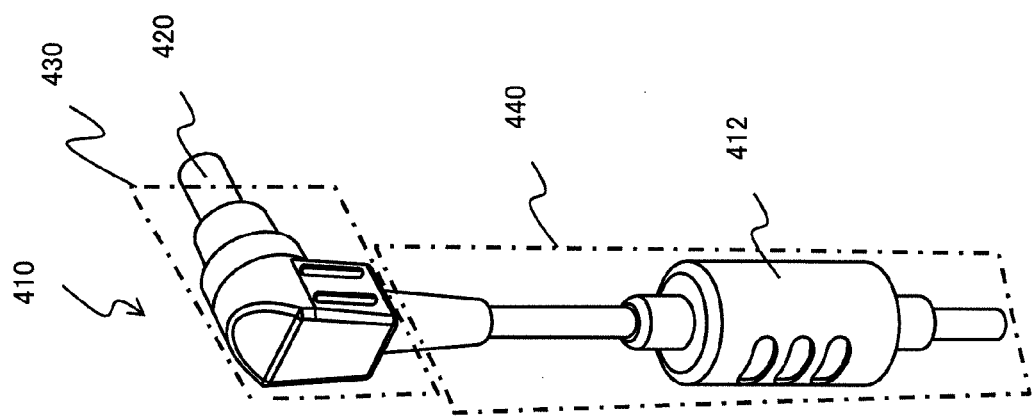
FIG. 4 is a view showing an external appearance of a connection cable in the first embodiment.

FIG. 4 is a view showing an external appearance of the connection cable in the first embodiment.

The connection cable 410 directs power supplied from an external power supply, to the electronic device body 110. The connection cable 410 has a connection terminal 420, a terminal body 430, and a cord 440.

The connection terminal 420 is disposed at an end of the connection cable 410. The connection terminal 420 has a metallic outer shell. The connection terminal 420 comes into contact with the accepting connection terminal 210 of the electronic device body 110 when the connection cable 410 is connected to the electronic device body 110. Contact of the connection terminal 420 with the accepting connection terminal 210 enables power to be supplied to the electronic device body 110.

The cord 440 is a string-like member. The cord 440 has a conductive wire in its interior. The conductive wire is electrically connected to the connection terminal 420. The cord 440 has an outer shell made of resin that covers the conductive wire. The resin outer shell has flexibility. Therefore, the cord 440 has flexibility. The cord 440 has a filter 412 that removes a high-frequency component of the power supply. Although in FIG. 4, depiction of an extremity end side (lower side in FIG. 4) is omitted, the extremity end side of the cord 440 is connected to an adaptor that converts AC voltage into DC voltage.

The terminal body 430 holds the connection terminal 420 and covers a connecting portion between the connection terminal 420 and the conductive wire of the cord 440. The terminal body 430 is made of resin. The terminal body 430 is formed integrally with the outer shell of the cord 440. Integral forming means that mutual positions are temporarily or permanently fixed. The terminal body 430 holds the connection terminal 420 and the end of the cord 440 such that the direction of extension of the cord 440 forms substantially 90 degrees with respect to the direction of connection of the connection terminal 420 (inserting direction; longitudinal direction of the connection terminal 420).

1-1-3. Schema of Connection of Electronic Device Body and Connection Cable

Figure 5:
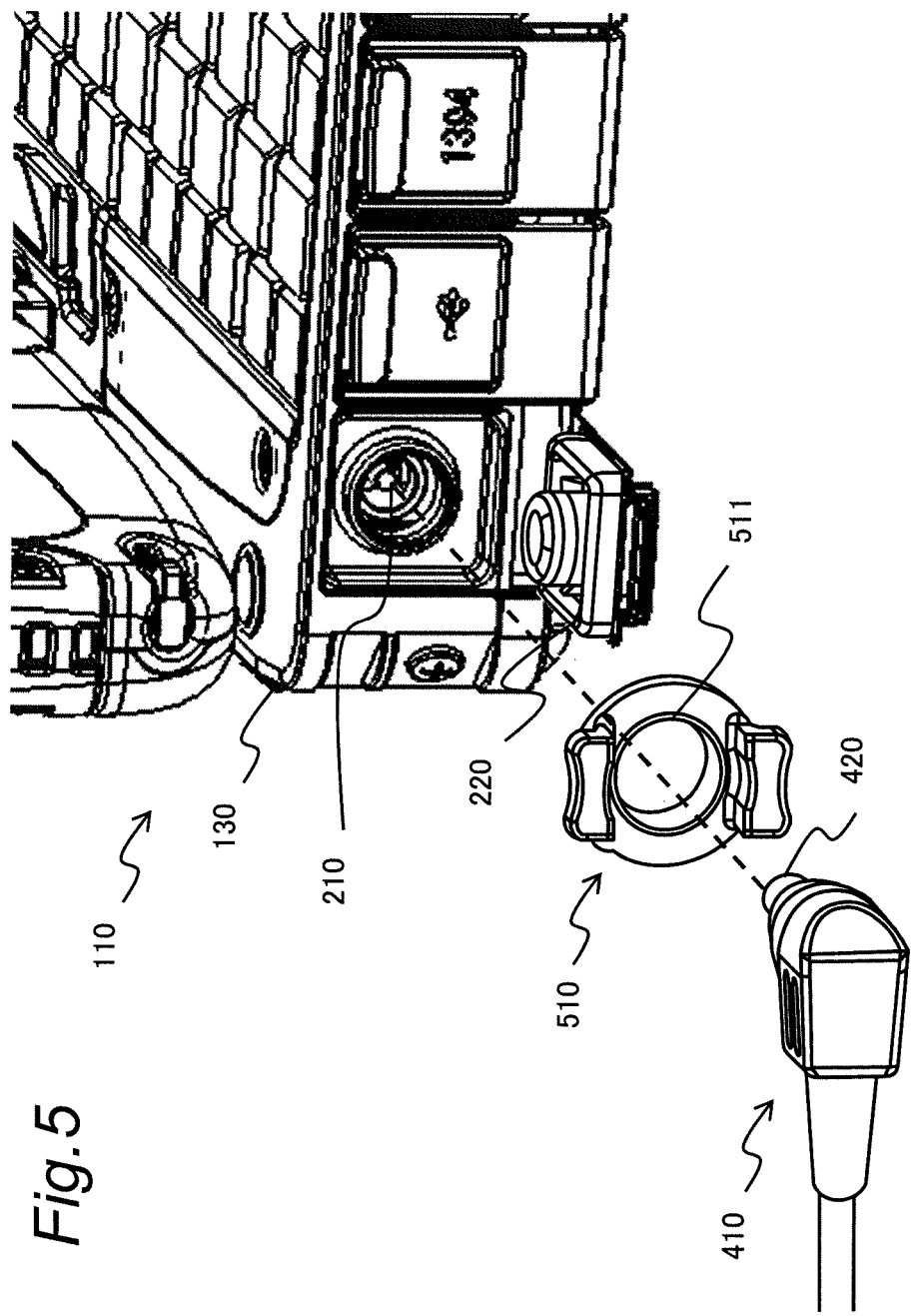
FIG. 5 is a view schematically showing a configuration where the electronic device body and the connection cable are connected together via an attachment.

A schema of connection of the electronic device body 110 and the connection cable 410 will be described with reference to the drawings. FIG. 5 is a view showing a configuration where the electronic device body and the connection cable in the first embodiment are connected together via an attachment.

In this disclosure, the connection cable 410 is connected via an attachment 510 to the accepting connection terminal 210 of the lower housing 130. More specifically, the attachment 510 has an opening 511 into which the connection terminal 420 of the connection cable 410 is inserted. Then, in that state, the connection terminal 420 is inserted into and connected to the accepting connection terminal 210. The attachment 510 is removable from the lower housing 130 of the electronic device body 110.

1-1-4. Configuration of Attachment

Figure 6:
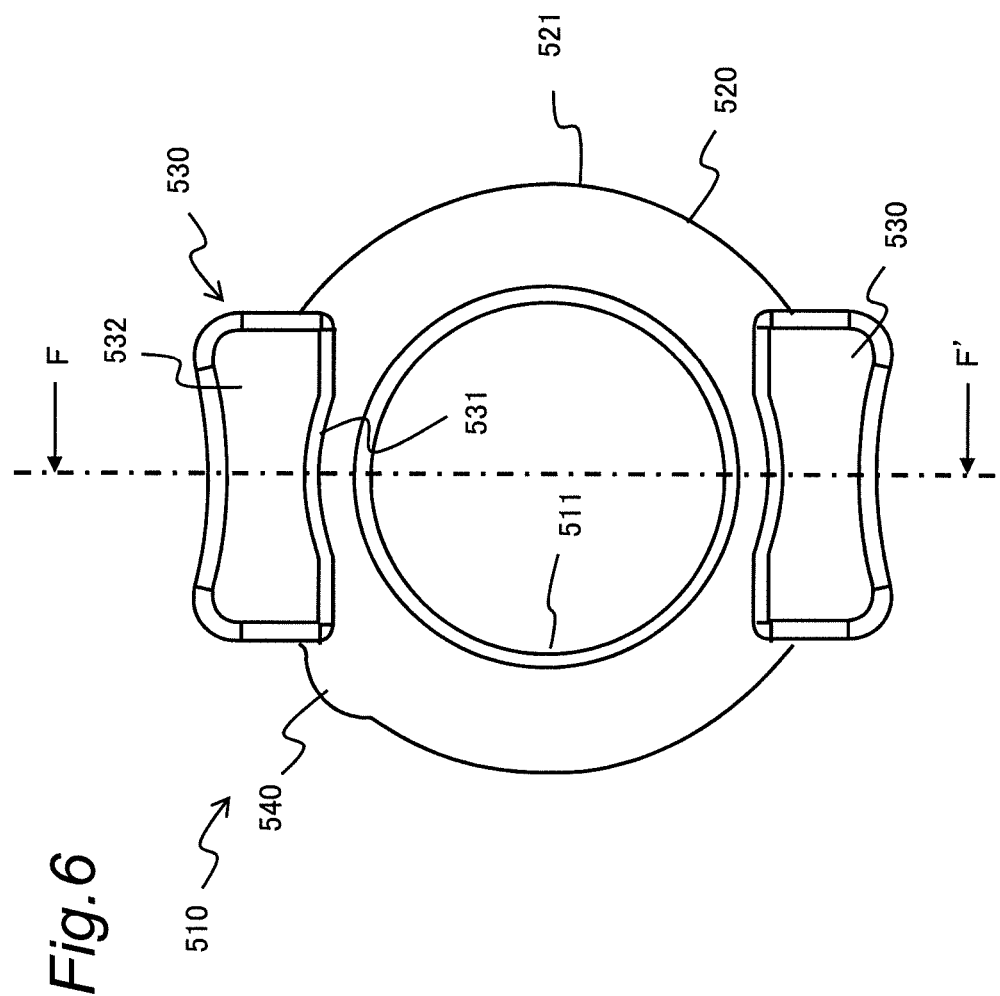
FIG. 6 is a view showing a front face (external appearance) of the attachment in the first embodiment.
Figure 7:
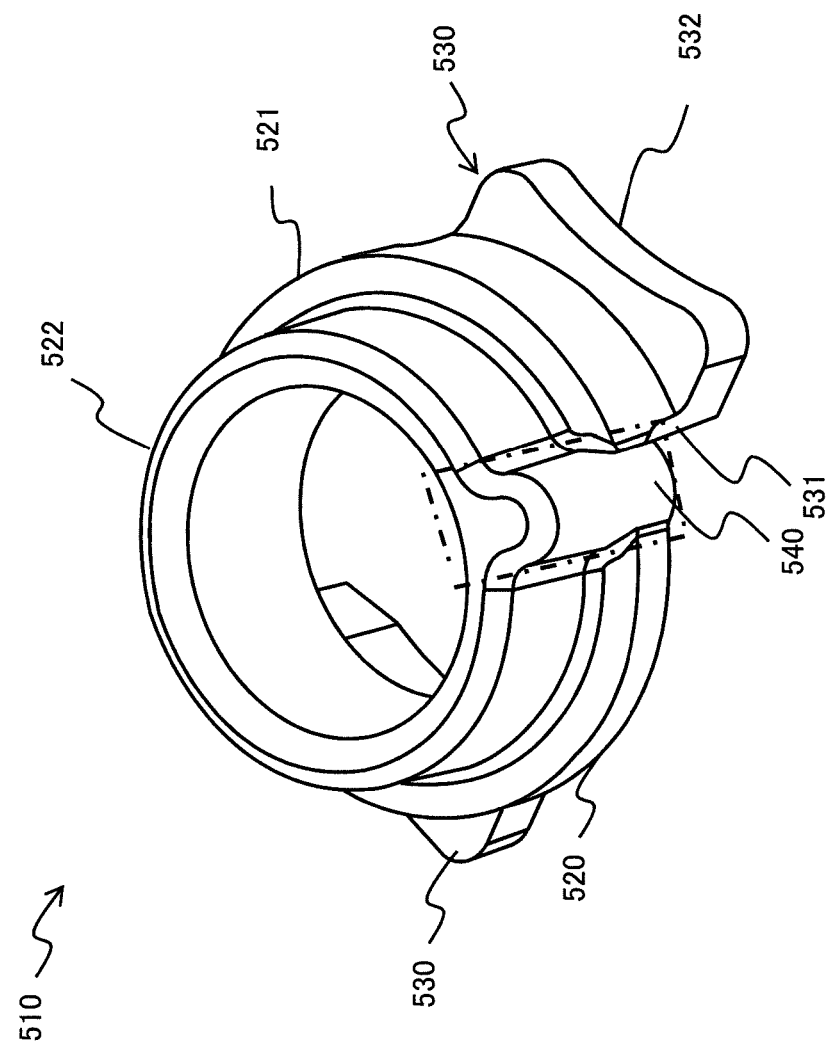
FIG. 7 is a perspective view showing a rear face (external appearance) of the attachment in the first embodiment.
Figure 8:
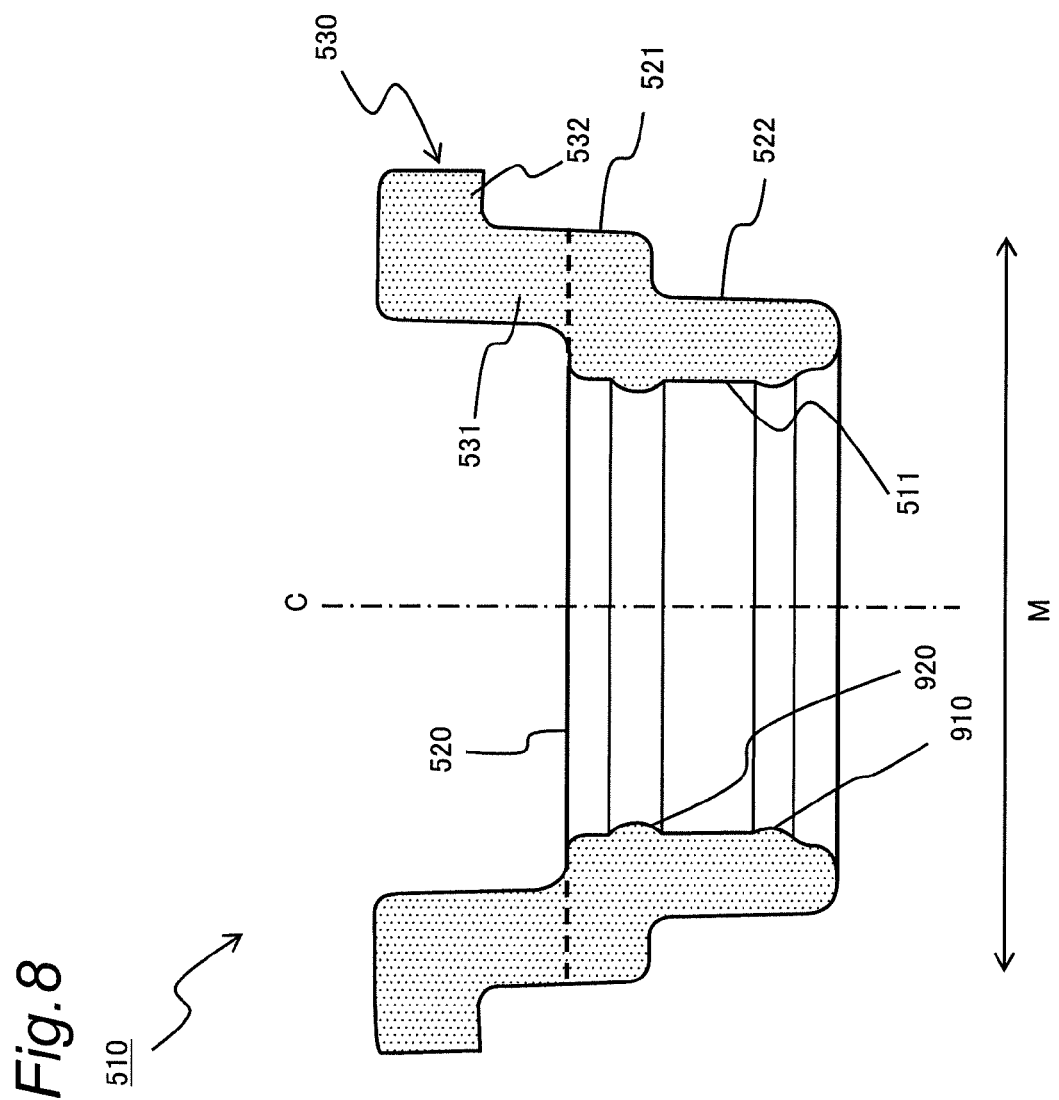
FIG. 8 is a view showing a section taken along line F-F' in FIG. 6.

A structure of the attachment will be described in detail. FIG. 6 is a view showing a front face (external appearance) of the attachment in the first embodiment. FIG. 7 is a perspective view showing a rear face (external appearance) of the attachment in the first embodiment. FIG. 8 is a view showing a section taken along line F-F' in FIG. 6. The front face is a face toward the opposite side to the electronic device body 110 when the attachment 510 is fitted to the electronic device body 110. The rear face is a face toward the side of the electronic device body 110 when the attachment 510 is fitted to the electronic device body 110.

The attachment 510 has a ring 520, a pair of rotation inhibiting projections 530, and a revolution inhibiting projection 540. The attachment 510 is made of resin.

The ring 520 is of an annular shape. The ring 520 has a large-diameter portion 521 and a small-diameter portion 522. The outer diameter of the large-diameter portion 521 is greater than the outer diameter of the small-diameter portion 522, while the inner diameter of the large-diameter portion 521 is equal to the inner diameter of the small-diameter portion 522.

The pair of rotation inhibiting projections 530 are arranged 180 degrees apart from each other in the circumferential direction of the ring 520 (see FIG. 6). Each of the rotation inhibiting projections 530 projects outward from the ring 520. The rotation inhibiting projections 530 have a substantially block-like shape. More specifically, each of the rotation inhibiting projections 530 has a transverse wall portion 531 and a vertical wall portion 532. As shown in FIG. 8, the transverse wall portion 531 projects toward the opposite side to the small-diameter portion 522 from the large-diameter portion 521 of the ring 520 in a center line direction C of the ring 520. The vertical wall portion 532 projects outward from an end of the transverse wall portion 531 in a radial direction M of the ring 520. That is, the transverse wall portion 531 and the vertical wall portion 532 project in mutually orthogonal directions to thereby impart an L-shape to the sectional shape of the rotation inhibiting projection 530.

As shown in FIG. 6, the revolution inhibiting projection 540 projects in the radial direction from the ring 520 (in the width direction and height direction of the ring 52; upper left direction in FIG. 6). As shown in FIG. 7, the revolution inhibiting projection 540 is a crest-like projection having a predetermined length in the thickness direction.

Figure 9:
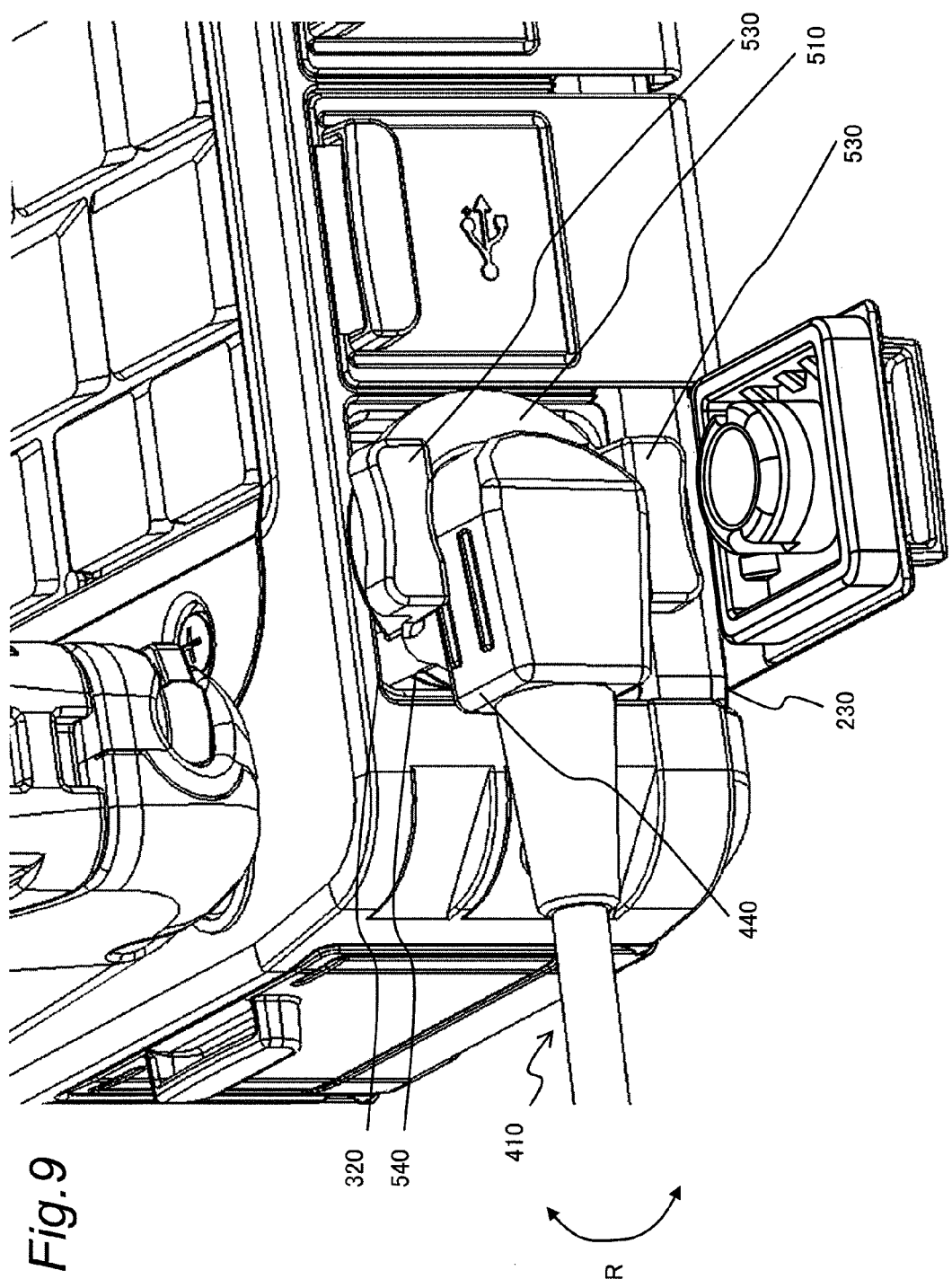
FIG. 9 is a perspective view showing a state where the electronic device body and the connection cable in the first embodiment are connected together via the attachment.
Figure 10:
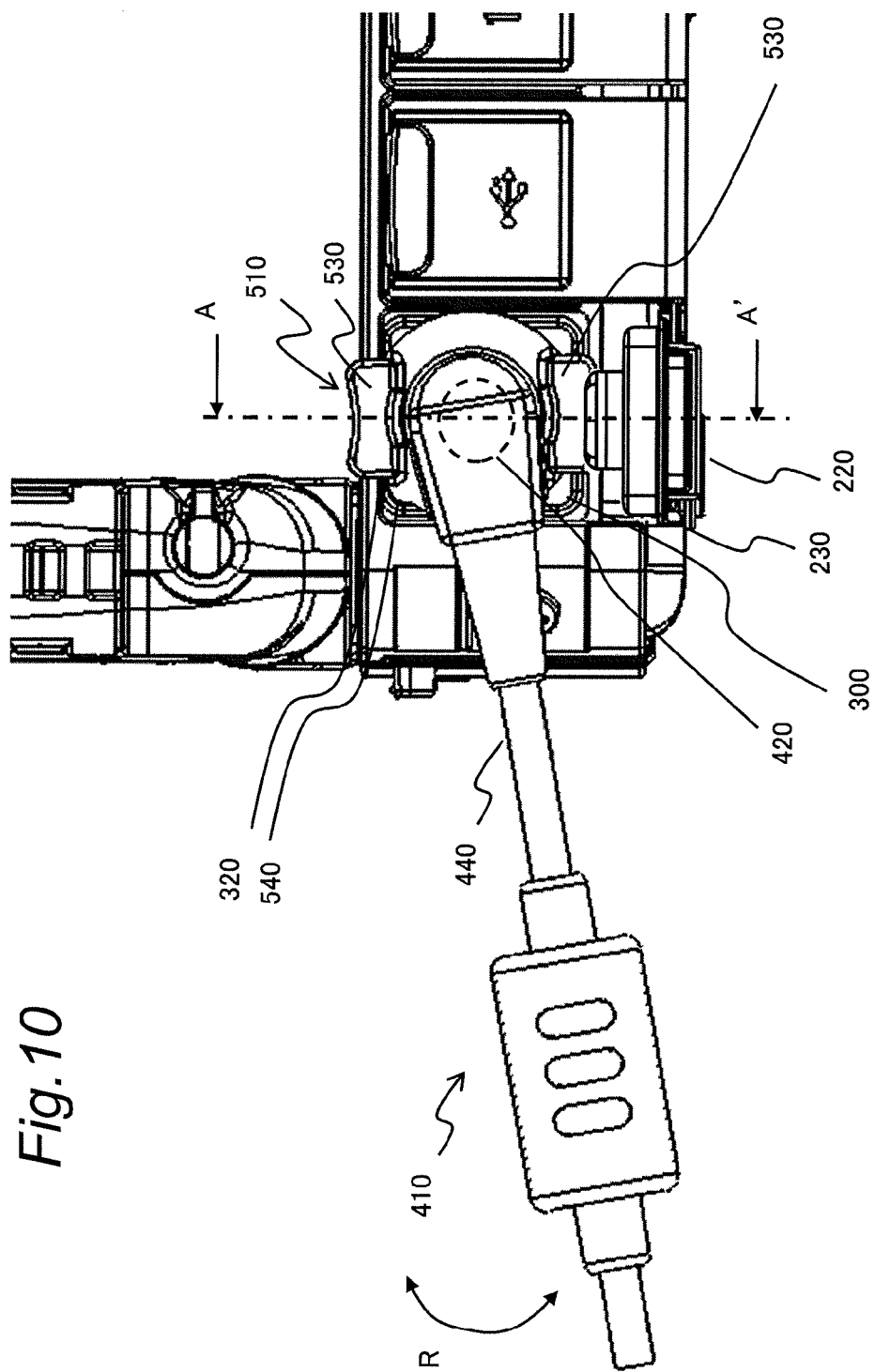
FIG. 10 is a side view showing the state where the electronic device body and the connection cable in the first embodiment are connected together via the attachment.

1-1-5. Specific Example of Connection of Electronic Device Body and Connection Cable Utilizing Attachment A specific example of connection of the electronic device body and the connection cable in the first embodiment utilizing the attachment will be described. FIG. 9 is a perspective view showing a state where the electronic device body and the connection cable in the first embodiment are connected together via the attachment. FIG. 10 is a side view showing the state where the electronic device body and the connection cable in the first embodiment are connected together via the attachment.

As shown in FIGS. 9 and 10, in the state where the attachment 510 is fitted to the electronic device body, the rotation inhibiting projections 530 project outward from the side surface of the lower housing 130 of the electronic device body 110. More specifically, the rotation inhibiting projections 530 project from the side surface of the lower housing 130 of the electronic device body 110 toward the opposite side to the lower housing 130 in a direction orthogonal to the side surface.

Figure 11:
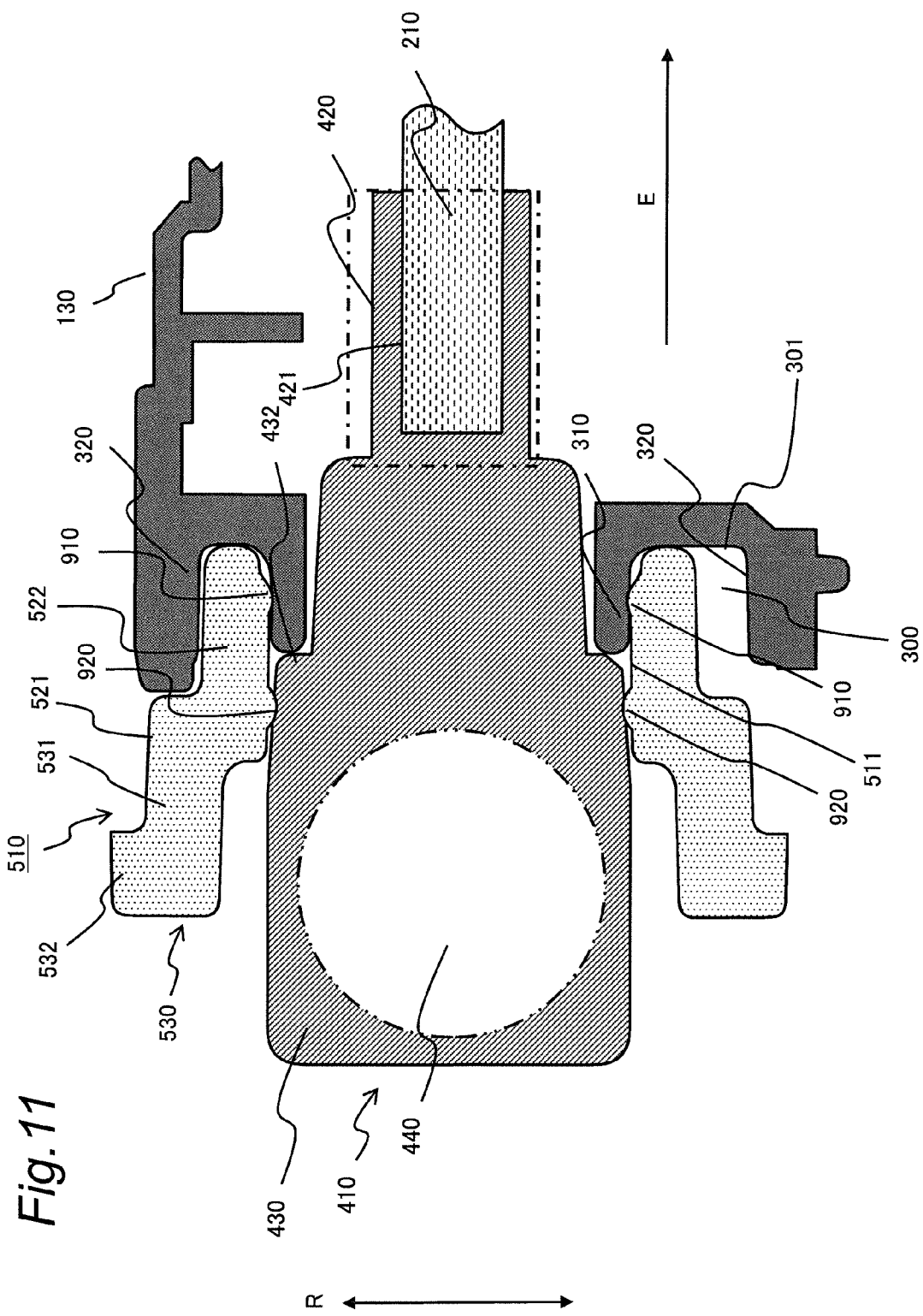
FIG. 11 is a view showing a section taken along line A-A' in FIG. 10.

FIG. 11 is a view showing a section taken along line A-A' in FIG. 10. As shown in FIG. 11, the connection terminal 420 of the connection cable 410 has an elongated hole 421 at its extremity end side. The elongated hole 421 is circular in section. At the time of connection of the connection cable 410 to the accepting connection terminal 210, the accepting connection terminal 210 of the lower housing 130 is inserted into the elongated hole 421 of the connection terminal 420 of the connection cable 410. At this time, the accepting connection terminal 210 and the connection terminal 420 come into contact with each other for electrical connection.

The connection terminal 420 and a part of the terminal body 430 are inserted into the opening 511 of the attachment 510. With the attachment 510 being fitted to the lower housing 130, the small-diameter portion 522 of the ring 420 and the annular rib 310 fit in with each other.

As shown in FIG. 8 as well, a first attachment-side rib 910 and a second attachment-side rib 920 are formed on the inner peripheral surfaces of the small-diameter portion 522 and the large-diameter portion 521 of the ring 520 of the attachment 510. The first attachment-side rib 910 and the second attachment-side rib 920 are each formed in the shape of a ring. In the state where the attachment 510 is fitted to the lower housing 130 as shown in FIG. 11, the first attachment-side rib 910 is in contact with the annular rib 310 of the lower housing 130. Accordingly, it becomes hard for the attachment 510 to come off from the lower housing 130.

With the connection cable 410 being connected, the second attachment-side rib 920 is in contact with the terminal body 430. This makes it difficult for the terminal body 430 to come off from the attachment 510. At this time, a stepped portion 432 of the terminal body 430 comes into abutment against an extremity end of the annular rib 310 of the lower housing 130. This inhibits the terminal body 430 from being further pushed toward the accepting connection terminal 210.

Figure 12:
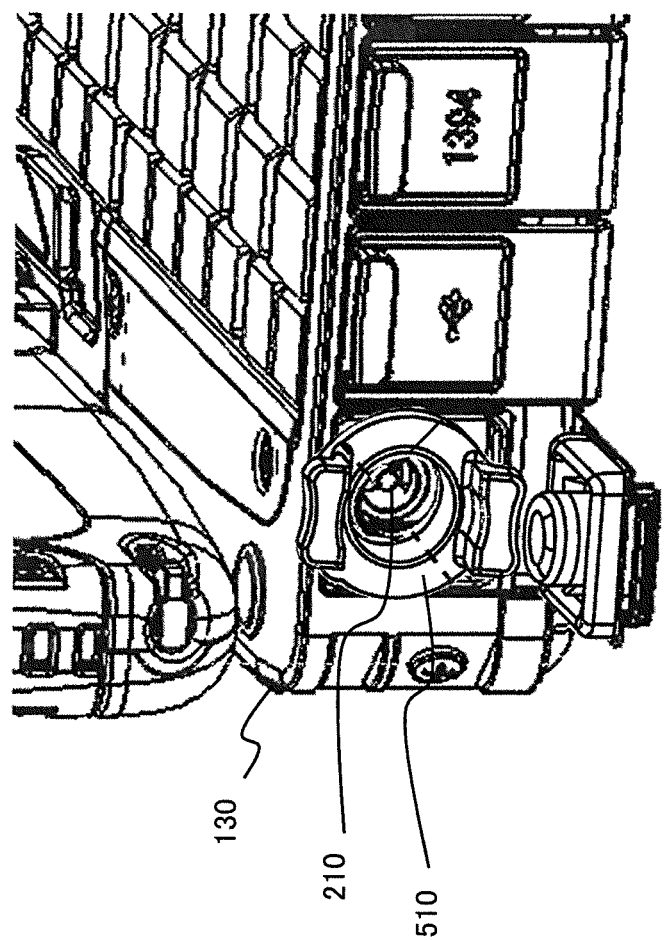
FIG. 12 is a perspective view showing a state where the attachment is fitted to the electronic device body in the first embodiment.
Figure 13:
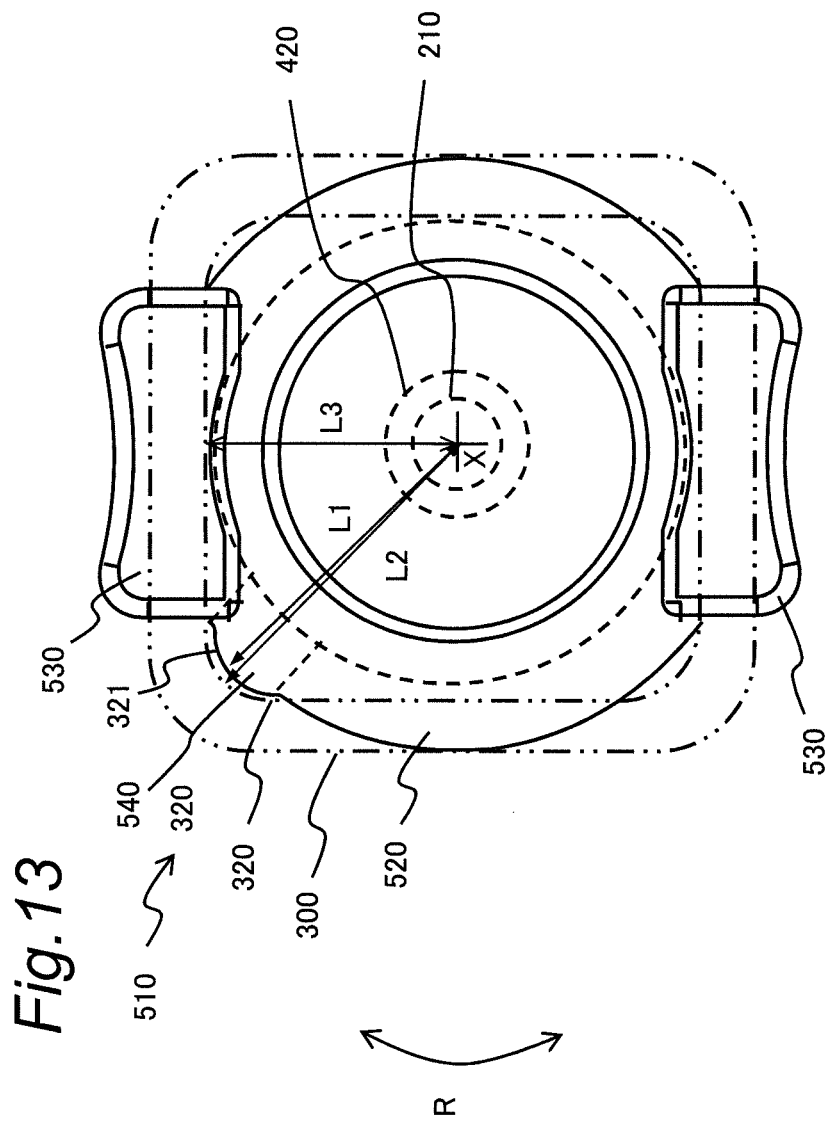
FIG. 13 is an enlarged view of a side surface of the electronic device body fitted with the attachment in the first embodiment.

FIG. 12 is a perspective view showing a state where the attachment is fitted to the electronic device body in the first embodiment. FIG. 13 is an enlarged view of a side surface of the electronic device body fitted with the attachment in the first embodiment. In FIG. 13, members other than the attachment 510 are indicated by double-dotted lines.

As shown in FIG. 13, with the attachment 510 being fitted to the electronic device body, a center X of the accepting connection terminal 210 of the electronic device body coincides with a center X of the attachment 510 (a center X of the ring 520). In this embodiment, a length L2 between the center X of the accepting connection terminal 210 of the electronic device body and a corner 321 of the bottom surface 301 of the recess 300 is slightly longer than a length L1 between the center X of the attachment 510 (the center of the ring 520) and an extremity end of the revolution inhibiting projection 540. On the other hand, the length L2 in the vertical direction (transverse direction) between the center X of the accepting connection terminal 210 of the electronic device body and the bottom surface 301 of the recess 300 is shorter than the length L1 between the center X of the attachment 510 and the extremity end of the revolution inhibiting projection 540. For this reason, when the attachment 510 is fitted to the recess 300 of the lower housing 130 of the electronic device body, there is a need for the revolution inhibiting projection 540 to be positioned at the corner 321 of the recess 300, for fitting. According to such a configuration, when a force in the rotation direction is applied to the attachment 510 in the state where the attachment 510 is fitted to the recess 300, only a minute rotation of the attachment 510 allows the revolution inhibiting projection 540 of the attachment 510 to come into contact with an inner wall 320 of the recess 300. At this time, a stress is generated in the inner wall 320. This prevents the attachment 510 from relatively rotating (revolving) in an R-direction with respect to the lower housing 130. That is, rotation (revolution) of the attachment 510 relative to the electronic device body 110 is inhibited.

1-2. Operation by Cable Connection Structure of Electronic Device of this Embodiment An operation of the cable connection structure in the electronic device configured as described above will be described. When the user touches the connection cable 410 or when an external force is applied to the connection cable 410, the connection cable 410 sometimes rotates around the accepting connection terminal 210. In this case, the connection terminal 420 rotates in the R-direction (shown in FIGS. 9 to 11) that is a direction substantially orthogonal to an inserting direction E of the connection cable 410. The rotation of the connection terminal 420 brings about a rotation of the cord 440 formed integrally with the connection terminal 420. In FIG. 11, the cord 440 is indicated by a double dotted line. The cord 440 extends from the front side toward the depth side in FIG. 11.

When the connection cable 410 rotates, the attachment 510 is subjected to a force causing the attachment 510 to rotate in the R-direction. This is because the connection cable 410 is fitted into the attachment 510 as described with reference to FIG. 11. As described using FIG. 13, however, rotation of the attachment 510 in the R-direction is inhibited by abutment of the revolution inhibiting projection 540 against the inner wall 320. More specifically, a force rotating in the R-direction is applied to the attachment 510, a stress is generated between the revolution inhibiting projection 540 and the inner wall 320. For that reason, when the attachment 510 rotates in the R-direction by a minute amount, the rotation of the attachment 510 in the R-direction stops.

When the rotation of the attachment 510 stops, the connection cable 410 rotates relatively in the R-direction not only with respect to the accepting connection terminal 210 but also with respect to the attachment 510. In this case, the rotation inhibiting projection 530 is disposed projecting from the side surface of the lower housing 130 so as to lie on a rotation trajectory of the terminal body 430 of the connection cable 410 in the state where the attachment 510 is fitted to the lower housing 130. For that reason, when the terminal body 430 of the connection cable 410 rotates, the terminal body 430 comes into abutment against the rotation inhibiting projection 530 as shown in FIG. 10.

This will be described in detail. FIG. 14 is an enlarged view of the side surface of the electronic device body fitted with the attachment. In FIG. 14, members other than the attachment 510 are indicated by double-dotted lines. When the connection cable 410 rotates in the R-direction with respect to the attachment 510, the terminal body 430 abuts against the transverse wall portion 531 of the rotation inhibiting projection 530. As a result, rotation of the terminal body 430 of the connection cable 410 is restricted within the range of an angle D around the accepting connection terminal 210. Since in this embodiment the rotation inhibiting projection 530 has the vertical wall portion 532 projecting in a direction orthogonal to the transverse wall portion 531, deformation of the transverse wall portion 531 can be suppressed when a rotation force is applied from the terminal body 430 to the transverse wall portion 531. Thus, the rotation of the terminal body 430 can be suppressed inhibited to a satisfactory extent.

Referring back to FIG. 10, when the terminal body 430 abuts against the rotation inhibiting projection 530, the rotations of the terminal body 430 and the cord 440 are restricted, with the result that the cord 440 does not abut against the support 230. The angle D in FIG. 14 is set to an amount that, when the connection cable 410 rotates around the accepting connection terminal 210 with the connection cable 410 being connected to the accepting connection terminal 210, the cord 440 of the connection cable 410 does not abut against the cover 220. In other words, the shape of the rotation inhibiting projection 530 is so defined that the angle D can be obtained. By intentionally bending the cord 440 to a large extent, the cord 440 comes into abutment against the support. However, a force of the cord 440 pressing the support 230 at that time becomes smaller than the case of a structure where the cord 440 does not abut against the rotation inhibiting projection 530.

1-3. Effect, Etc.

As described above, in this embodiment, the electronic device includes the accepting connection terminal 210 to which the connection cable 410 can be connected, and the attachment 510 that inhibits the connection cable 410 from rotating around the accepting connection terminal 210 an amount equal to or greater than a predetermined amount in the state where the connection cable 410 is connected to the accepting connection terminal 210.

With this configuration, the connection cable 410 can be inhibited from rotating around the accepting connection terminal 210 an amount equal to or greater than the a predetermined amount in the state where the connection cable 410 is connected to the accepting connection terminal 210.

In this embodiment, the attachment 510 has the rotation inhibiting projection 530 that projects outward with respect to the external surface of the lower housing 130 of the electronic device, whereupon when the connection cable 410 rotates around the accepting connection terminal 210 with the connection cable 410 being connected to the accepting connection terminal 210, the rotation inhibiting projection 530 and the connection cable 410 abut against each other, to thereby inhibit the connection cable 410 from rotating around the accepting connection terminal 210 an amount equal to or greater than the predetermined amount.

With this configuration, in the case where with the connection cable 410 being connected to the accepting connection terminal 210, the connection cable 410 rotates around the accepting connection terminal 210, the terminal body 430 of the connection cable 410 comes into abutment against the rotation inhibiting projection 530. Hence, the cord 440 does not abut against the support 230 or, if it abuts, the force applied to the support 230 from the cord 440 is reduced. This is because the rotation force of the cord 440 is caught by the abutment of the terminal body 430 against the rotation inhibiting projection 530. Thus, a risk reduces that there occur problems such as breakage of the support 230 as a result of abutment of the cord 440 against the support 230 and breaking of the cord 440. That is, the durability of the electronic device is enhanced.

In this embodiment, the electronic device has, in the vicinity of the accepting connection terminal 210, the cover 220 that is openably supported via the support 230 (hinge portion) on the lower housing 130. The predetermined amount is an amount that the connection cable 410 and the cover 220 do not abut against each other when the connection cable 410 rotates around the accepting connection terminal 210 in the state where the connection cable 410 is connected to the accepting connection terminal 210.

With this configuration, the connection cable 410 further reduces the risk that the cord 440 abuts against the support 230, unless the cord 440 is bent strongly. Thus, the durability of the electronic device can further be enhanced.

In this embodiment, the attachment 510 is removable from the lower housing 130.

With this configuration, the user can attach the attachment 510 if it is judged that the attachment 510 should be utilized, whereas the user can remove the attachment 510 if it is judged that utilization of the attachment 510 is unnecessary. This enables the user to utilize the attachment 510 depending on the situation of use of the electronic device. Thus, the user's convenience is enhanced.

In this embodiment, the attachment 510 has a revolution inhibiting projection 540 that inhibits the attachment 510 from revolving around the accepting connection terminal 210 relative to the lower housing 130.

With this configuration, the revolution of the attachment 510 can be inhibited.

In this embodiment, the revolution inhibiting projection 540 is a projection disposed on the external surface of the attachment 510. The revolution inhibiting projection 540 comes into abutment against the inner wall 320 of the lower housing 130 of the electronic device when the attachment 510 revolves, to thereby inhibit a predetermined amount of or more revolution of the attachment 510.

With this configuration, the revolution of the attachment 510 can be inhibited. This enables the cord 440 of the connection cable 410 and the rotation inhibiting projection 530 to more securely be in contact with each other.

In this embodiment, the accepting connection terminal 210 is arranged within the recess 300 formed in the side surface of the electronic device. The revolution inhibiting projection 540 contact with a part of the recess 300.

With this configuration, the overall configuration of the electronic device can be made compact. The water proof and dust proof performances of the accepting connection terminal 210 are enhanced.

In this embodiment, the lower housing 130 is disposed with the annular rib 310 (protruding portion) that can fit in with the attachment 510.

With this configuration, the user can simply attach the attachment 510 to the lower housing 130. Thus, the user's convenience is enhanced.

In this embodiment, the attachment 510 has the opening 511 into which the connection terminal 420 can be inserted.

With this configuration, by inserting the connection terminal 420 into the opening 511 of the attachment 510, the attachment 510 can be restrained from coming off from the lower housing 130. Thus, the user's convenience is enhanced.

In this embodiment, the attachment 510 is provided that is utilized when the connection cable 410 is connected to the accepting connection terminal 210 of the electronic device. The attachment 510 includes the ring 520 that can fit in with the annular rib 310 (a part of the housing) of the lower housing 130 of the electronic device; and the rotation inhibiting projection 530 that projects outward with respect to the external surface of the lower housing 130 in the state where the ring 520 fits in with the annular rib 310 of the lower housing 130 of the electronic device. The revolution inhibiting projection 530 is formed at a position where the revolution inhibiting projection 530 and the connection cable 410 come into abutment against each other, when the connection cable 410 rotates around the accepting connection terminal 210 a predetermined amount in the state where the ring 520 is fitted in and where the connection cable 410 is connected to the accepting connection terminal 210.

With this configuration, by adding the attachment 510 to the existing electronic device, the rotation inhibiting function can simply be implemented in the existing electronic device as well.

The attachment 510 of this embodiment may be provided as one constituent member of the connection cable 410. In other words, there may be provided the connection cable having the attachment 510.

With this configuration, the user can utilize the attachment 510 when utilizing the connection cable 410.

Although in this embodiment an example of forming the rotation inhibiting projection 530 on the attachment 510 is shown, the range of application of this disclosure is not limited thereto. The rotation inhibiting projection 530 may be formed on the electronic device body 110.

Although in this embodiment an example of molding the support 230 integrally with the outer shell member of the cover 220 is shown, the range of application of this disclosure is not limited thereto. The support 230 may be formed from a well-known hinge portion using a rod made of a metal material.

Although in this embodiment an example of the connection cable being a cable supplying power to the electronic device is shown, the range of application of this disclosure is not limited thereto. The connection cable may be a cable through which an electrical signal or an optical signal is inputted or outputted between the electronic device and other devices.

As set forth hereinabove, the embodiment has been described as an exemplification of technique in this disclosure. To this end, the accompanying drawings and detailed description have been provided.

Accordingly, among the constituent elements described in the accompanying drawings and detailed description there may be involved not only constituent elements essential to solve the problem but also constituent elements unessential to solve the problem, for the purpose only of exemplifying the technique. Hence, those unessential constituent elements should not be recognized as being essential immediately from the fact that those unessential constituent elements are described in the accompanying drawings and the detailed description.

Since the above embodiment is for the purpose of exemplifying the technique of this disclosure, various changes, permutations, additions, and omissions could be made within the scope of the patent claims and of their equivalents.

INDUSTRIAL APPLICABILITY

This disclosure is applicable to an electronic device having a connection cable. More specifically, this disclosure is applicable to a tablet terminal, a smartphone, and the like.

What is claimed is:
1. An electronic device comprising:
an accepting connection terminal to which a connection cable can be connected; and
a rotation inhibiting member that inhibits the connection cable from rotating an amount equal to or greater than a predetermined amount around the accepting connection terminal in a state where the connection cable is connected to the accepting connection terminal; and
a cover disposed in a vicinity of the accepting connection terminal that is openably supported via a hinge portion on a housing, wherein
the rotation inhibiting member is removable from the housing,
the rotation inhibiting member includes a revolution inhibiting projection that inhibits the rotation inhibiting member from revolving around the accepting connection terminal relative to the housing,
the revolution inhibiting projection is a first projection formed on an external surface of the rotation inhibiting member,
the first projection comes into abutment against a predetermined portion of the housing when the rotation inhibiting member revolves, to thereby inhibit revolution of the rotation inhibiting member, and
the predetermined amount is an amount that the connection cable and the cover do not abut against each other when the connection cable rotates around the accepting connection terminal in the state where the connection cable is connected to the accepting connection terminal.

2. The electronic device of claim 1, wherein
the rotation inhibiting member includes a second projection that projects outward with respect to an external surface of the housing of the electronic device, the second projection and the connection cable coming into abutment against each other when the connection cable rotates around the accepting connection terminal in the state where the connection cable is connected to the accepting connection terminal, thereby inhibiting the connection cable from rotating around the accepting connection terminal an amount equal to or greater than the predetermined amount.

3. The electronic device of claim 1, wherein
the accepting connection terminal is disposed within a recess formed in the external surface of the housing,
the revolution inhibiting projection comes into contact with a part of the recess.

4. The electronic device of claim 1, wherein
the housing has a projecting portion that is allowed to fit in with the rotation inhibiting member.

5. The electronic device of claim 1, wherein
the rotation inhibiting member has an opening into which the connection cable can be inserted.

6. An attachment utilized upon connection of a connection cable to an accepting connection terminal of an electronic device, comprising:
a fitting-in portion that is allowed to fit in with a part of a housing of the electronic device;
a revolution inhibiting projection that is formed on an external surface of the attachment,
a rotation inhibiting projection that projects outwardly from an edge of the external surface of the attachment and with respect to an external surface of the housing in a state where the fitting-in portion fits in with a part of the housing of the electronic device, wherein
the electronic device comprises a cover disposed in a vicinity of the accepting connection terminal that is openably supported on the housing,
the revolution inhibiting projection comes into abutment against a predetermined portion of the housing when the attachment revolves, to thereby inhibit revolution of the attachment,
the rotation inhibiting projection is formed to inhibit the attachment from revolving around the accepting connection terminal at a position where the rotation inhibiting projection and the connection cable come into abutment against each other when the connection cable rotates a predetermined amount around the accepting connection terminal in a state where the fitting-in portion fits in and where the connection cable is connected to the accepting connection terminal, and
the predetermined amount is an amount that the connection cable and the cover do not abut against each other when the connection cable rotates around the accepting connection terminal in the state where the connection cable is connected to the accepting connection terminal.

7. A connection cable comprising:
a connection terminal connectable to an accepting connection terminal of an electronic device; and
an attachment of claim 6.

* * * * *